Patented July 3, 1934

1,964,971

UNITED STATES PATENT OFFICE 1,964,971

ALKYL ETHERS OF AMINO-BETA-HYDROXYANTHRAQUINONES

Walther Albrecht, Ludwigshafen-on-the-Rhine, and Julius Mueller, Mannheim, Germany, assignors to General Aniline Works, Inc., New York, N. Y., a corporation of Delaware No Drawing. Application November 5, 1931, Serial No. 573,302. In Germany November 8, 1930

8 Claims. (Cl. 260—59)

The present invention relates to an improvement in the alkylation of amino-beta-hydroxyanthraquinones.

While beta-hydroxyanthraquinones may be alkylated by the usual methods such as heating the aqueous or alcoholic alkaline solutions with alkylating agents such as dialkyl sulphates or alkyl iodides, the alkylation of amino-beta-hydroanthraquinones by these methods produces unsatisfactory yields.

We have now found that amino-beta-hydroxyanthraquinones can be alkylated, while obtaining good yields, when treating an amino-beta-hydroxyanthraquinone with a neutral ester of an aliphatic alcohol in a ketone capable of dissolving water though only in a small amount in the presence of a basic compound of the alkaline or alkaline earth metals including magnesium and water. Neutral esters of aliphatic alcohols which may be employed for the purpose of our invention are, for example, the said esters of sulphuric acid, halogen hydracids, viz. hydrochloric, hydrobromic and hydriodic acid, and arylsulphonic acids, such as benzene-, toluene- and naphthalene-sulphonic acids. Any aliphatic alcohol in the form of its neutral ester may be used for the alkylation, in particular the said alcohols of low molecular weight; for example methyl, ethyl, the isomeric propyl, butyl and amyl alcohols. Ketones suitable for the process are such as are capable of dissolving at least 3 per cent of their weight of water, such as acetone, methyl ethyl ketone, diethyl ketone and cyclohexanone. Any anthraquinone containing an amino group and a hydroxy group in the beta position and which are free from acid groups, may be alkylated in the aforedescribed manner. Any substituent other than acid groups may be present in the initial material without interfering with the reaction, for example halogen, such as chlorine and bromine, nitro, cyano and alkyl groups. In case the initial material contains a hydroxy group as substituent in an alpha position such hydroxy groups are not alkylated but remain unaltered. Basic compounds of the alkaline or alkaline earth metals or magnesium which are added to the reaction mixture, are, for example, the hydroxides of the said metals or salts thereof with weak acids, such as their carbonates, acetates and the like. The reaction is preferably carried out at elevated temperatures, but in many cases may be carried out at room temperature.

The aminohydroxyanthraquinone alkyl ethers thus obtainable in a simple manner industrially are valuable intermediate products for the manufacture of dyestuffs and are in part important dyestuffs themselves, especially for acetyl cellulose fibres.

The following examples will further illustrate how the said invention may be carried out in practice, but the invention is not restricted to these examples. The parts are by weight.

Example 1

3 parts of dimethyl sulphate are allowed to drop during the course of half an hour into a boiling mixture of 5 parts of 1-amino-2-hydroxyanthraquinone, 50 parts of acetone and a solution of 1.4 parts of calcined soda in 9 parts of water, whereby a red crystalline precipitate commences to separate out. The whole is kept boiling for an hour, cooled and the ether formed filtered off by suction. The ether is washed with dilute caustic soda solution and water. An analogous procedure is followed when employing methyl ethyl ketone, diethyl ketone or cyclohexanone.

The substance obtained corresponds to the formula

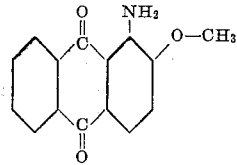

and melts at from 220° to 222° C. It differs from 1-amino-2-hydroxyanthraquinone in that it is insoluble in alkalies and dissolves in 70 per cent oleum to give a blue violet, and not a red violet, coloration. It dyes acetate silk brilliant orange shades. The same dyestuff is obtained by employing methyl iodide instead of dimethyl sulphate.

When diethyl sulphate is employed instead of dimethyl sulphate a product which dyes acetate silk somewhat more reddish orange shades is obtained.

Example 2

5 parts of 1-amino-2-hydroxyanthraquinone are mixed with 60 parts of acetone, 20 parts of 10 per cent caustic soda solution and 7.5 parts of para-toluene sulphonic acid methyl ester and boiled under a reflux condenser for 10 hours. The ether which is filtered off by suction after cooling is identical with the product according to Example 1.

Example 3

100 parts of acetone and a solution of 2.6 parts of calcined soda in 18 parts of water are added to 10 parts of 1-amino-2.4-dihydroxyanthraquinone and heated to boiling. 5 parts of dimethyl sulphate are allowed to run in during the course of half an hour and the reaction mixture is boiled for another 2 hours. After cooling, the ether formed is filtered off by suction and washed with dilute caustic soda solution and water.

The substance obtained may be crystallized from glacial acetic acid. It corresponds to the formula

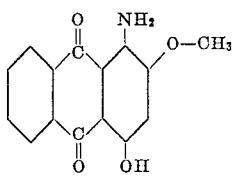

and melts at from 224° to 226° C. Contrasted with the initial material which dissolves readily in hot dilute caustic soda solution giving a violet red coloration, it is difficultly soluble in hot dilute caustic soda solution giving a violet coloration. It is insoluble in cold dilute soda solution while the initial material dissolves therein giving a red coloration. The ether dyes acetate silk powerful brilliant yellow red shades.

Example 4

A solution of 2.6 parts of caustic potash in 10 parts of water is allowed to drop at the boiling temperature into 10 parts of 4-amino-1.2-dihydroxyanthraquinone to which have been added 200 parts of acetone and 6 parts of dimethyl sulphate. The reaction mixture is kept boiling for an hour, allowed to cool and filtered by suction. The filter cake is washed with cold dilute soda solution until the latter runs through colorless.

The substance obtained corresponds to the formula

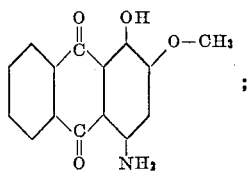

it is soluble in a large amount of boiling glacial acetic acid and crystallizes therefrom in the form of red violet needles having a melting point of from 283° to 284° C. It is insoluble in cold dilute soda solution, and difficultly soluble in hot dilute soda or dilute caustic soda solution giving a red violet coloration, while the initial material dissolves readily giving a red violet coloration. The ether dyes acetate silk violet red shades.

Example 5

5 parts of 1.4-diamino-2-hydroxyanthraquinone are heated to boiling in 50 parts of acetone and 9 parts of 15 per cent soda solution and while boiling 3 parts of dimethyl sulphate are gradually added. After boiling for 2 hours the reaction mixture is cooled with ice water and the violet black crystalline precipitate is filtered off by suction. The reaction may also be carried out at room temperature.

The substance obtained corresponds to the formula

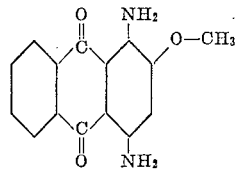

It is readily soluble in acetone, difficultly soluble in benzene and more difficultly soluble in ligroin. It differs from the initial material in that it is insoluble in alkalies. The ether dyes acetate silk powerful brilliant violet red shades.

Example 6

26 parts of 30 per cent caustic potash solution are gradually added at the boiling temperature to 9 parts of 1.4-di-(monomethylamine)-5.6-dihydroxyanthraquinone and 9 parts of dimethyl sulphate in 180 parts of acetone. After boiling for 2 hours the reaction mixture is allowed to cool, the precipitate filtered off by suction and washed first with dilute caustic soda solution and then with water.

The substance obtained corresponds to the formula

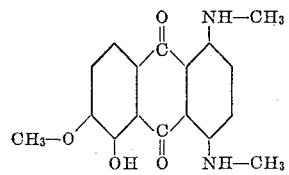

It is a dark blue powder which crystallizes from glacial acetic acid in the form of sharp blue needles having a bronze lustre. It is soluble in concentrated sulphuric acid giving an orange solution and is insoluble in cold dilute caustic soda solution in contrast to the initial material which dissolves readily therein giving a green blue solution. It dyes acetate silk blue green shades.

Example 7

200 parts of acetone and 10 parts of dimethyl sulphate are added to 10 parts of 2-amino-3-hydroxyanthraquinone, and a solution of 8.8 parts of caustic potash in 20 parts of water is allowed to flow in gradually at the boiling temperature. The reaction mixture is kept boiling for an hour and the precipitate filtered off by suction after cooling.

While the initial material is soluble in caustic soda solution giving a carmine red coloration, the ether is insoluble therein. It corresponds to the formula

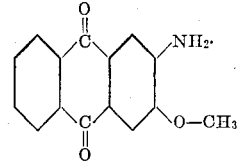

and dissolves in concentrated sulphuric acid giving an orange yellow coloration. It crystallizes from glacial acetic acid in the form of yellow red needles having a melting point of from 261° to 263° C. It dyes acetate silk orange shades.

Example 8

5 parts of 1-amino-2-hydroxyanthraquinone are heated to boiling in 50 parts of acetone with 10 parts of a 10 per cent aqueous solution of caustic soda, whereupon 4.2 parts of n-amyliodide are introduced in the course of ½ hour, while boiling. The mixture is kept boiling for 2 hours. After cooling, the ether produced is filtered off and washed with dilute caustic soda solution and water. It corresponds to the formula

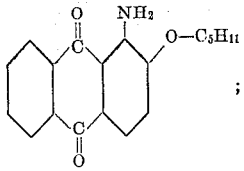

it is insoluble in alkalies, dissolves in concentrated sulphuric acid giving an orange-yellow solution and in ethylacetate giving an orange solution. It dyes cotton more reddish shades than the methyl ether described in Example 1.

*Example 9*

5 parts of 1-amino-2.4-dihydroxyanthraquinone are mixed with 50 parts of acetone and a solution of 1.3 parts of sodium carbonate in 9 parts of water. The mixture is heated to boiling and 3.1 parts of diethyl sulphate are slowly introduced. After boiling for 1 hour the reaction mixture is strongly cooled and the dyestuff filtered off. It corresponds to the formula

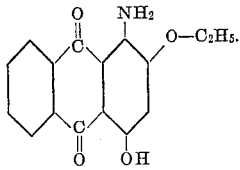

and dyes acetate silk essentially more bluish rose shades than the product obtained according to Example 3.

*Example 10*

5 parts of 1.4-diamino-2-hydroxyanthraquinone are suspended in 50 parts of methyl ethyl ketone and the mixture is heated to boiling after the addition of a 10 per cent aqueous solution of caustic soda, 3 parts of dimethyl sulphate being then slowly introduced. The mixture is heated to boiling under reflux for 1 hour and the dyestuff filtered off after cooling. It is identical with the product obtained according to Example 5.

*Example 11*

10 parts of 1.4-diamino-2-hydroxyanthraquinone in 100 parts of acetone are mixed with 20 parts of a 10 per cent aqueous solution of caustic soda and 6 parts of dimethylsulphate are dropped in. The reaction mixture is stirred for 12 hours at room temperature and the dyestuff formed filtered off. It is identical with the product obtained according to Example 5.

*Example 12*

1 part of magnesium oxide is added to a mixture of 5 parts of 1-amino-2-hydroxyanthraquinone and 50 parts of acetone and the whole is heated to boiling and 3 parts of dimethyl-sulphate are slowly introduced. After boiling for 3 hours the reaction mixture is allowed to cool and the dyestuff filtered off. It is freed from magnesium oxide by means of warm dilute hydrochloric acid and washed with dilute caustic soda solution. The dyestuff is identical with that described in Example 1.

*Example 13*

5 parts of calcined soda dissolved in 13 parts of water are introduced into a mixture of 10 parts of 1-amino-2.4-dihydroxyanthraquinone and 40 parts of cyclohexanone. 7 parts of dimethyl sulphate are slowly stirred into the mixture kept at 60° C. After stirring for 1 hour at the same temperature the reaction mixture is allowed to cool and the dyestuff filtered off. It is identical with the dyestuff described in Example 3.

*Example 14*

5 parts of 1-amino-2.4-dihydroxyanthraquinone are heated to boiling in 50 parts of acetone with a solution of 2 parts of calcined soda in 10 parts of water. During the course of ½ hour 5 parts of n-butyliodide are introduced into the mixture which is kept boiling for 5 hours. After cooling, the product is filtered off and washed with dilute caustic soda solution and water. The 1-amino-2-butoxy-4-hydroxyanthraquinone corresponding to the formula

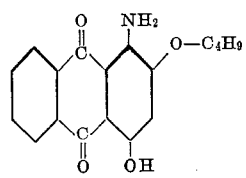

is insoluble in cold alkalies and difficultly soluble in hot caustic alkali solutions. It dyes acetate silk rose shades.

What we claim is:—

1. A process of producing alkyl ethers of amino-beta-hydroxyanthraquinones, which comprises causing a neutral ester of an aliphatic alcohol selected from the group consisting of inorganic and sulphonic acid esters to react on an amino-beta-hydroxyanthraquinone free from acid groups in a ketone capable of dissolving at least 3 per cent of its weight of water in the presence of water and a basic compound of a metal selected from the group consisting of alkali, alkaline earth metals and magnesium.

2. A process of producing alkyl ethers of amino-beta-hydroxyanthraquinones, which comprises causing a neutral ester of an aliphatic alcohol selected from the group consisting of inorganic and sulphonic acid esters to react on an amino-beta-hydroxyanthraquinone free from acid groups in acetone in the presence of water and a basic compound of a metal selected from the group consisting of alkali, alkaline earth metals and magnesium.

3. A process of producing alkyl ethers of amino-beta-hydroxyanthraquinones, which comprises causing a dialkylsulphate to react on an amino-beta-hydroxyanthraquinone free from acid groups in acetone in the presence of water and a basic compound of a metal selected from the group consisting of alkali, alkaline earth metals and magnesium.

4. A process of producing an alkyl ether of 1-amino-2.4-dihydroxyanthraquinone, which comprises causing a dialkylsulphate to react on 1-amino-2.4-dihydroxyanthraquinone in acetone in the presence of water and sodium carbonate.

5. As new article of manufacture 1-amino-2-alkoxy-4-hydroxyanthraquinones crystallizing from glacial acetic acid difficultly soluble in hot dilute caustic soda solution giving a violet coloration, insoluble in cold dilute soda solution and dyeing acetate silk red shades.

6. As new article of manufacture 1-amino-2-methoxy-4-hydroxyanthraquinone crystallizing from glacial acetic acid, difficultly soluble in hot dilute caustic soda solution giving a violet coloration, insoluble in cold dilute soda solution and dyeing acetate silk powerful yellow red shades.

7. As new article of manufacture 1-amino-2-ethoxy-4-hydroxyanthraquinone crystallizing from glacial acetic acid, difficultly soluble in hot dilute caustic soda solution giving a violet coloration, insoluble in cold dilute soda solution and dyeing acetate silk bluish rose shades.

8. As new article of manufacture 1-amino-2-butoxy-4-hydroxyanthraquinone crystallizing from glacial acetic acid, difficultly soluble in hot dilute caustic soda solution giving a violet coloration, insoluble in cold dilute soda solution and dyeing acetate silk rose shades.

WALTHER ALBRECHT.
JULIUS MUELLER.